(No Model.)
P. C. COMPTON.
Grain and Seed Separator.
No. 240,889.   Patented May 3, 1881.
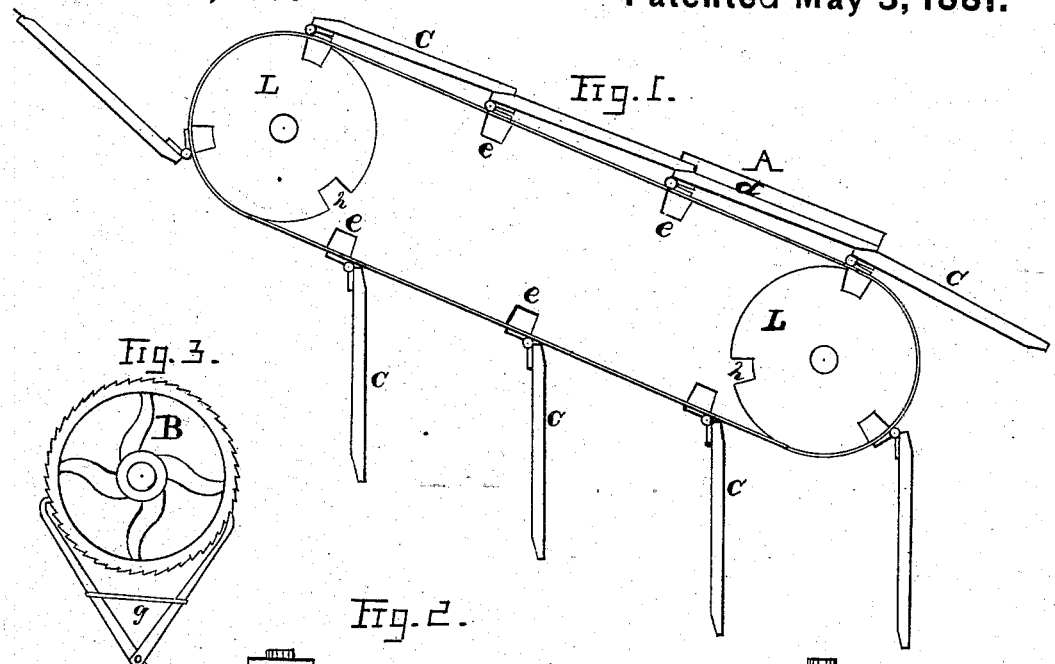
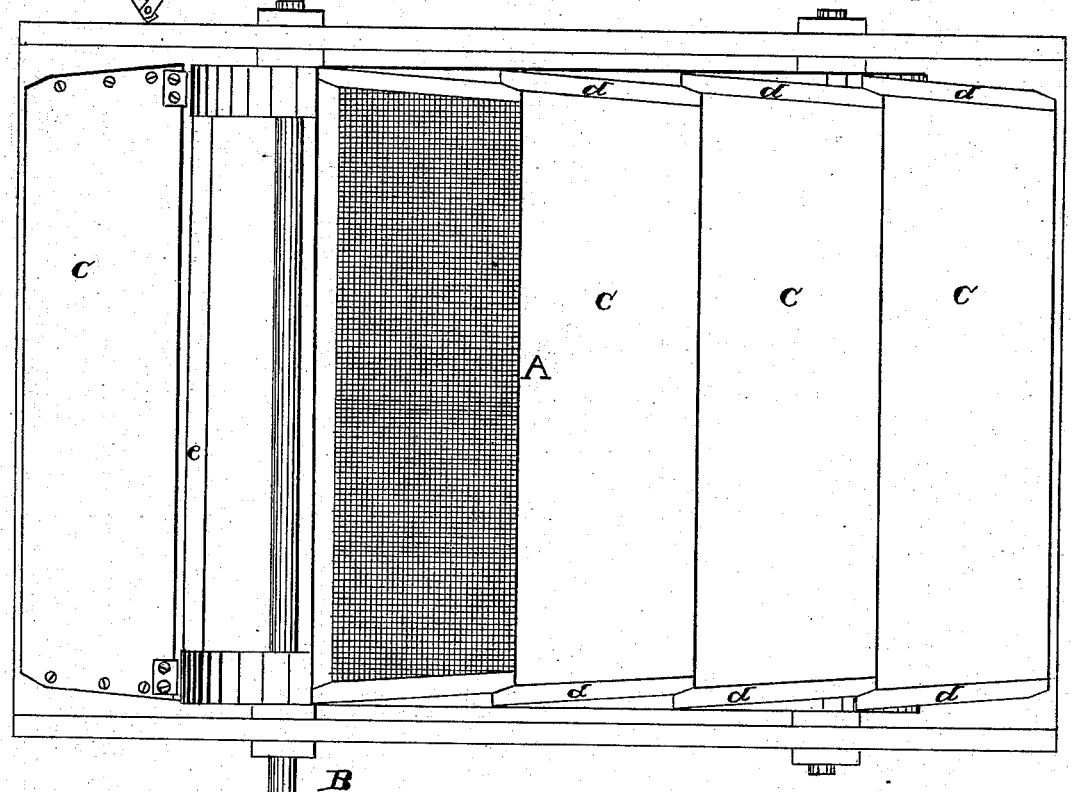
Witnesses
A. Thomson
J. V. Knoodt
Inventor
Porter C. Compton
B. S. Kirk, atty (No Model.) 2 Sheets—Sheet 2.

P. C. COMPTON.
Grain and Seed Separator.

No. 240,889. Patented May 3, 1881.

Witnesses
A. Thomson
T. V. Hoggatt

Inventor
Porter C. Compton

UNITED STATES PATENT OFFICE.

PORTER C. COMPTON, OF AMES, IOWA.

GRAIN AND SEED SEPARATOR.

SPECIFICATION forming part of Letters Patent No. 240,889, dated May 3, 1881.

Application filed August 18, 1880. (No model.)

*To all whom it may concern:*

Be it known that I, PORTER C. COMPTON, a citizen of the United States, residing at Ames, in the county of Story and State of Iowa, have invented certain new and useful Improvements in Grain and Seed Separators; and I do hereby declare the following to be a full, clear, and exact description of the invention, such as will enable others skilled in the art to which it appertains to make and use the same, reference being had to the accompanying drawings, and to the letters or figures of reference marked thereon, which form a part of this specification.

My invention relates to that class of machines which separate grain and seed by means of their shape, as cockle from wheat, mustard from flax-seed, &c.

Figure 4:
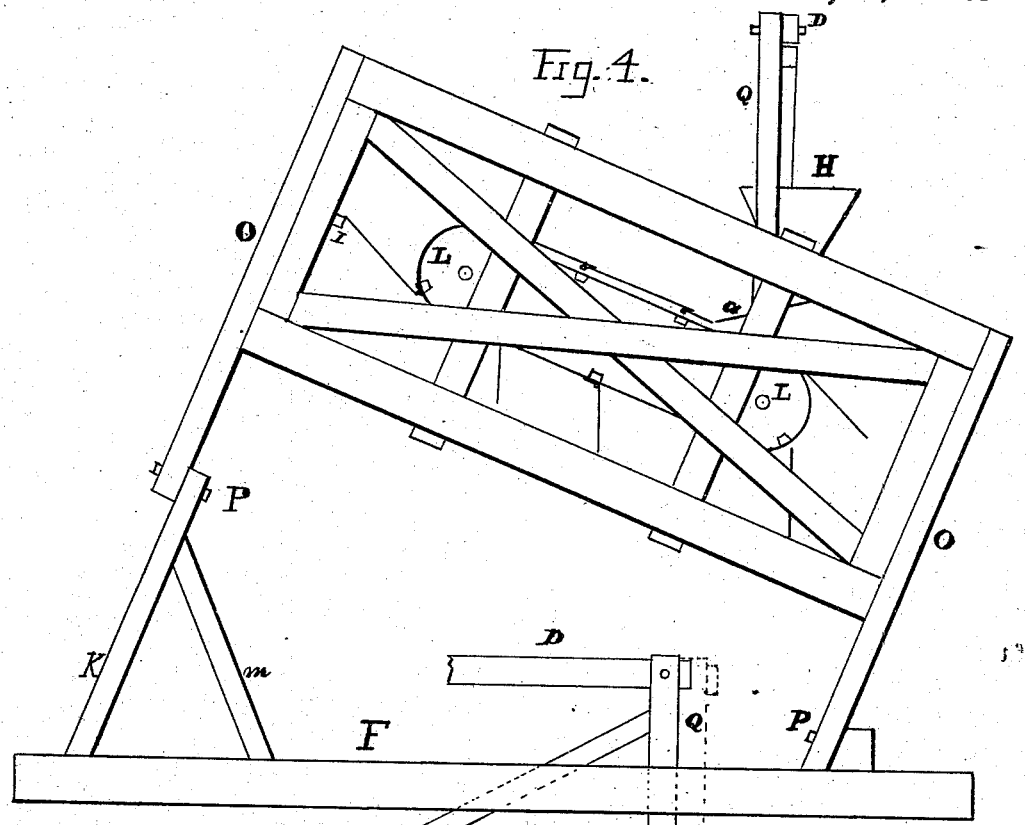
Figure 5:
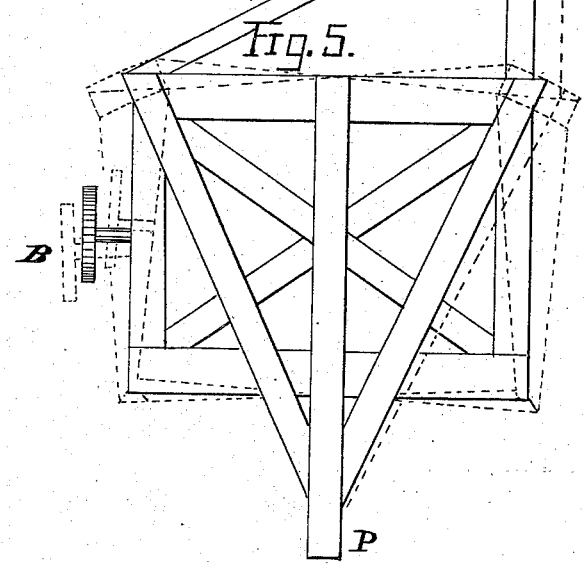

Figure 1 represents a side view of the revolving apron, showing the ends of the cross-ribs e e, &c., the notched pulleys L, and the method of hinging the sections C to the belts and cross-ribs. Fig. 2 is a plan view, showing cleats d d on the ends of slats or sections, the covering of wire-cloth being shown on one of the sections at A, the back of slat C at the left, and its hinges and cross-rib e. The position of the actuating ratchet-wheel is shown at B. Fig. 3 is a side view of the ratchet-wheel and pawls. Fig. 4 is a side view of the frame of the machine, showing pivots P P, standards O O, and rocking arm Q, the hopper H, and feed-board a. Fig. 5 is an end view of the frame, showing arm Q, pitman D, pivots P, and ratchet-wheel B.

The upper surface of the slats or sections is clothed or covered with wire-cloth A, tacked on snugly. The cleats d d, &c., on the ends of the slats serve to strengthen them, to give a body to which the butts or hinges are fastened, and hold the grain or seeds from sliding off over the side of the apron. These slats or sections lap one over the other, as shown in Figs. 1 and 2, forming a continuous apron. The cross-ribs e e, &c., Figs. 1 and 2, serve as a body to which the butts or hinges are fastened through the belts, and by working into the notches in the pulleys keep the apron true or square. The pulleys are rigid on their axles. The upper ones are driven by the ratchet-wheel B, and by means of the notches h h give a positive motion to the apron.

The ratchet-wheel B is fixed on the end of either shaft or axle, and vibrates, rocks, or oscillates with the supporting-frame of the apron. The motion of the apron-frame as it rocks on the pivots P gives the ratchet-wheel an inclined upward-and-downward movement in an arc with P as a center, as shown by dotted lines in Fig. 5. The pawls g are fixed to any stationary solid footing in the plane of the ratchet-wheel, on pivots, and held to either side of the wheel by a rubber or spiral spring. In a rocking or oscillating machine the pawls should be pivoted or hinged above or below the wheel. In a machine vibrating longitudinally they should be pivoted at points nearly horizontal to the wheel in the same plane. In a machine vibrating laterally both ratchet-wheel and pawls may be in any plane parallel with the axle, and connected to the axle by bevel-gear. It will be readily seen that the reciprocating ratchet-wheel, held on either side alternately by the fixed pawls, will revolve by impulses intermittently received and carry over the apron, as shown.

The hopper H is fixed, being held by any stationary support. The feed-board a is fast to the machine and moves with it, and receives the grain or seeds from the bottom of the hopper faster or slower, according to the distance between them.

In operating the machine, the whole apron-frame reciprocates a few inches on the pivots P P, moved by the pitman D through the arm Q, and carrying with it the ratchet-wheel B and feed-board a. The grain or seed feeds from the hopper H and spreads evenly over the feed-board, and is discharged with as little fall as possible onto the separating-surface. The agitation then immediately separates the seeds. The heavier, smoother, and oblong seeds are shaken off the lower end of the apron, while the rough, round, lighter, and smaller seeds are held in the meshes of the wire-cloth and carried over the upper end of the apron. As the slats or sections revolve over they fall, swinging on their hinges, and strike on a cross-bar, I, Fig. 4, with a sharp rap, which discharges all impurities at once. Side spouts at either end carry grain and impurities each to its proper conductor.

Having described my invention, what I claim is as follows:

1. In a separating-machine, the series of slats or sections C, covered on their upper surface with wire-cloth, hinged to an endless belt and overlapping each other, as shown, so as to render the wire-covered surface practically continuous, in combination with suitable pulleys and operating devices, substantially as and for the purpose set forth.

2. In a separating-machine, the oscillating inclined slats C, covered with wire-cloth and operated by the pulleys L, ratchet B, attached to the oscillating frame, and double pawls attached to a stationary frame, substantially as and for the purpose set forth.

3. In a separating-machine, the slats or sections C, covered with wire, hinged to an endless belt, in combination with suitable operating devices and stop I, whereby said sections C are carried up the incline and thrown over against stop I, whereby the discharge of the cockle or other separated substances is facilitated, substantially as and for the purpose set forth.

In testimony whereof I affix my signature in presence of two witnesses.

PORTER C. COMPTON.

Witnesses:
A. THOMSON,
CYRUS E. TURNER.